United States Patent
Zhou et al.

(10) Patent No.: US 9,153,959 B2
(45) Date of Patent: Oct. 6, 2015

(54) PHASE DETECTION CIRCUIT

(71) Applicant: ShenZhen Goldsun Network Intelligence Technology Co., Ltd., Shenzhen (CN)

(72) Inventors: Hai-Qing Zhou, Shenzhen (CN); Yi-Xin Tu, Shenzhen (CN)

(73) Assignee: ShenZhen Goldsun Network Intelligence Technology Co., Ltd., ShenZhen (CN)

(*) Notice: Subject to any disclaimer, the term of this patent is extended or adjusted under 35 U.S.C. 154(b) by 0 days.

(21) Appl. No.: 14/205,531

(22) Filed: Mar. 12, 2014

(65) Prior Publication Data

US 2014/0265630 A1    Sep. 18, 2014

(30) Foreign Application Priority Data

Mar. 12, 2013    (CN) .......................... 2013 1 0077781

(51) Int. Cl.

| | |
|---|---|
| B23K 11/24 | (2006.01) |
| G05F 1/455 | (2006.01) |
| H02M 1/32 | (2007.01) |
| H02K 47/30 | (2006.01) |
| H02H 11/00 | (2006.01) |

(52) U.S. Cl.
CPC .......... *H02H 11/004* (2013.01); *Y10T 307/747* (2015.04)

(58) Field of Classification Search
CPC  H02M 1/32; H02M 2001/325; H02M 3/1584
USPC ............ 323/237, 241, 272, 246; 363/50, 149; 327/2, 127; 307/127; 361/85
See application file for complete search history.

(56) References Cited

U.S. PATENT DOCUMENTS

| | | | |
|---|---|---|---|
| 7,821,414 B2* | 10/2010 | Chen et al. ..................... | 340/657 |
| 2008/0180265 A1* | 7/2008 | Chen et al. ..................... | 340/641 |
| 2009/0102673 A1* | 4/2009 | Xiong et al. .................. | 340/658 |

* cited by examiner

*Primary Examiner* — Timothy J Dole
*Assistant Examiner* — Sisay G Tiku
(74) *Attorney, Agent, or Firm* — Novak Druce Connolly Bove + Quigg LLP

(57) ABSTRACT

A phase detection circuit includes first to third power input modules, first to third power input terminals, an alarm module, first to fifth electronic switches, and a power management module. The power input modules are used to convert pulse signals from a multi-phase power supply into direct current voltages and output the direct current voltages to the first to third electronic switches. When the multi-phase power supply operates abnormally, no direct current voltages are output to the first to third electronic switches and the alarm module alarms.

10 Claims, 2 Drawing Sheets

PHASE DETECTION CIRCUIT

BACKGROUND

1. Technical Field

The present disclosure relates to a phase detection circuit.

2. Description of Related Art

Many electronic devices have energy-saving control functions using multi-phase power supply. However, if one phase source of the multi-phase power supply fails to work properly, a conventional detecting circuit cannot detect the abnormal phase source, the multi-phase power supply will continue to work, thereby increasing the load to the remaining phase sources, which could damage the multi-phase power supply.

Therefore, there is room for improvement in the art.

BRIEF DESCRIPTION OF THE DRAWINGS

Many aspects of the present disclosure can be better understood with reference to the following drawing(s). The components in the drawing(s) are not necessarily drawn to scale, the emphasis instead being placed upon clearly illustrating the principles of the present disclosure. Moreover, in the drawing(s), like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The reference "a plurality of" means "at least two."

Figure 1:
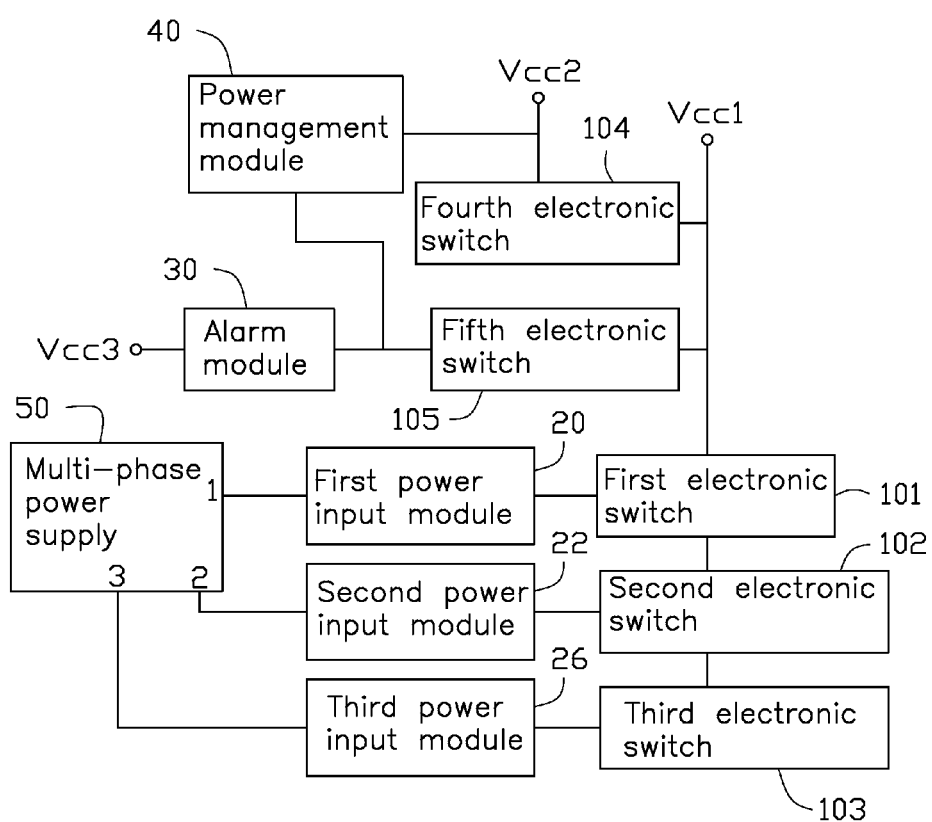
FIG. 1 is a block diagram of an embodiment of a phase detection circuit of the present disclosure.
Figure 2:
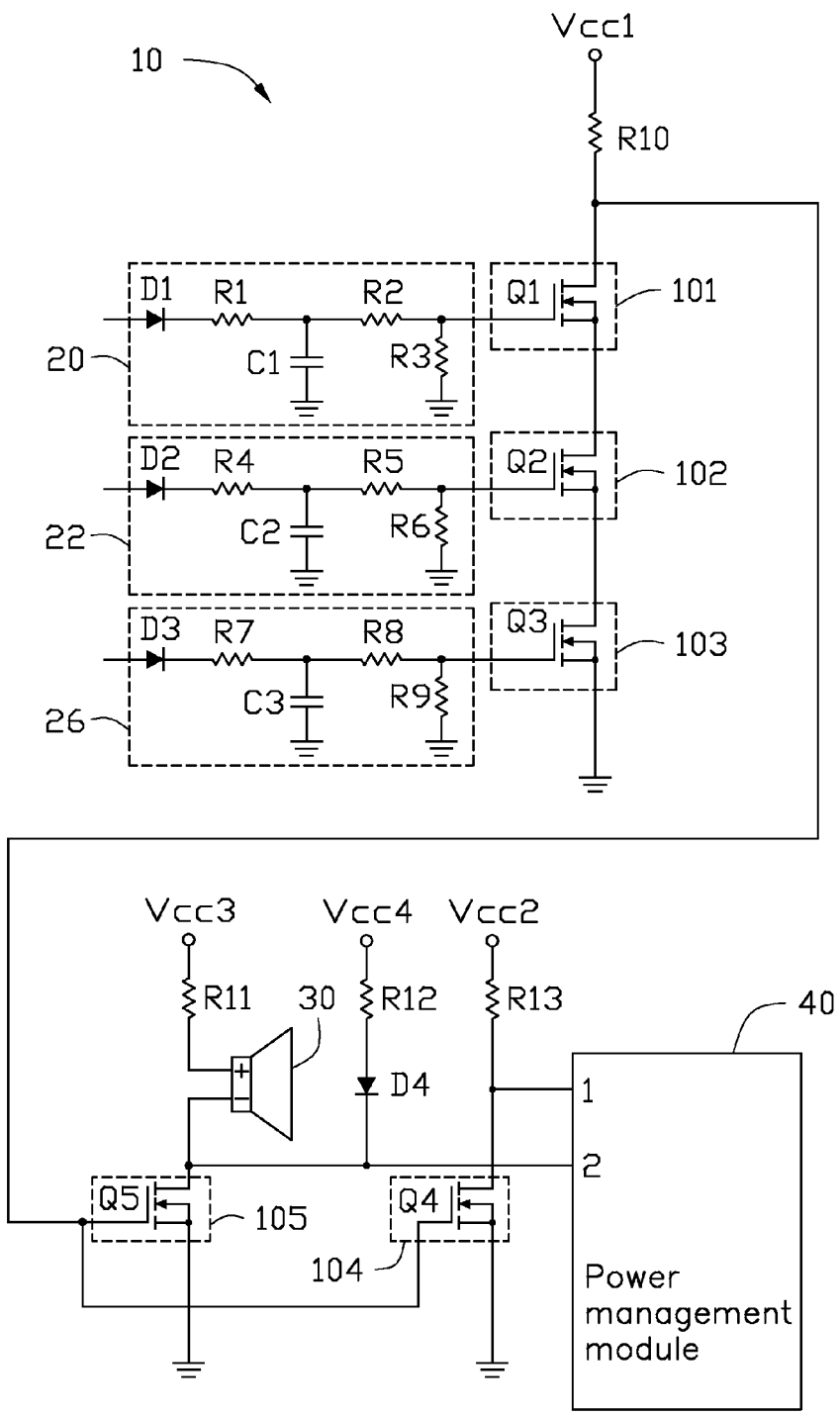
FIG. 2 is a circuit diagram of the phase detection circuit of FIG. 1.

FIGS. 1 and 2 show an embodiment of a phase detection circuit 10 of the present disclosure.

The phase detection circuit 10 is used to detect a multi-phase power supply 50. In the embodiment, the multi-phase power supply 50 has first to third phase output terminals 1-3. The phase detection circuit 10 comprises a first power input module 20, a second power input module 22, a third power input module 26, first to third power input terminals Vcc1-Vcc3, an alarm module 30, first to fifth electronic switches 101-105, and a power management module 40. The first to third power input terminals Vcc1-Vcc3 are used to input high level signals, such as logic 1.

The first phase output terminal 1 of the multi-phase power supply 50 is electrically connected to a first terminal of the first electronic switch 101 through the first power input module 20. The second phase output terminal 2 of the multi-phase power supply 50 is electrically connected to a first terminal of the second electronic switch 102 through the second power input module 22. The third phase output terminal 3 of the multi-phase power supply 50 is electrically connected to a first terminal of the third electronic switch 103 through the third power input module 26. A second terminal of the first electronic switch 101 is electrically connected to the first power input terminal Vcc1. A first terminal of the fourth electronic switch 104 is connected to the second terminal of the first electronic switch 101. A second terminal of the fourth electronic switch 104 is electrically connected to the second power input terminal Vcc2. A first terminal of the fifth electronic switch 105 is connected to the second terminal of the first electronic switch 101. A second terminal of the fifth electronic switch 105 is connected to the third power input terminal Vcc3 through the alarm module 30. A first pin 1 of the power management module 40 is connected to the second terminal of the fourth electronic switch 104. A second pin 2 of the power management module 40 is connected to the second terminal of the fifth electronic switch 105. A second terminal of the second electronic switch 102 is connected to a third terminal of the first electronic switch 101. A second terminal of the third electronic switch 103 is connected to a third terminal of the second electronic switch 102.

In the embodiment, the first to fifth electronic switches 101-105 are n-channel Field Effect Transistors (FETs). The first to fifth electronic switches 101-105 are correspondingly to be first to fifth FETs Q1-Q5, respectively. The first terminals of the first to fifth electronic switches 101-105 are correspondingly gates of the first to fifth FETs Q1-Q5. The second terminals of the first to fifth electronic switches 101-105 are correspondingly drains of the first to fifth FETs Q1-Q5. The third terminals of the first to fifth electronic switches are correspondingly sources of the first to fifth FETs Q1-Q5.

The first power input module 20 comprises a diode D1, resistors R1-R3, and a capacitor C1. The second power input module 22 comprises a diode D2, resistors R4-R6, and a capacitor C2. The third power input module 26 comprises a diode D3, resistor R7-R9, and a capacitor C3. The first phase output terminal 1 of the multi-phase power supply 50 is connected to an anode of the diode D1. A cathode of the diode D1 is grounded through resistors R1-R3 in that order. A node between the resistor R1 and the resistor R2 is grounded through the capacitor C1. A node between the resistor R2 and the resistor R3 is connected to the first terminal of the first electronic switch 101. The second phase output terminal 2 of the multi-phase power supply 50 is connected to an anode of the diode D2. A cathode of the diode D2 is grounded through the resistors R4-R6 in that order. A node between the resistor R4 and the resistor R5 is connected to the gate of the second FET Q2. The third phase output terminal 3 of the multi-phase power supply 50 is connected to an anode of the diode D3. A cathode of the diode D3 is grounded through the resistors R7-R9 in that order. A node between the resistor R7 and the resistor R8 is grounded through the capacitor C3. A node between the resistor R8 and the resistor R9 is connected to the gate of the third FET Q3.

The drain of the first FET Q1 is connected to the first power input terminal Vcc1 through a resistor R10. The source of the third FET Q3 is grounded. The drain of the fourth FET Q4 is connected to the second power input terminal Vcc2 through a resistor R13. The source of the fourth FET Q4 is grounded. The drain of the fifth FET Q5 is connected to a first terminal of the alarm module 30. A second terminal of the alarm module 30 is connected to the third power input terminal Vcc3 through a resistor R11. The drain of the fifth FET Q5 is connected to the second pin 2 of the power management module 40. The source of the fifth FET Q5 is grounded. A fourth power input terminal Vcc4 is connected to an anode of a diode D4. A cathode of the diode D4 is connected to the second pin of the power management module 40. In the embodiment, the alarm module 30 is a buzzer. The fourth power input terminal Vcc4 is used to input a high level signal, such as logic 1.

The multi-phase power supply 50 outputs first to third pulse signals through the first to third phase output terminals 1-3 respectively. The first to third pulse signals are integrated and divided to be first to third direct current (DC) voltages by the first to third power input modules 20, 22, 26 respectively. When the multi-phase power supply 50 operates normally, the first to third DC voltages are output to the gates of the first to third FETs Q1-Q3 respectively. The first to third FETs Q1-Q3 are turned on. The fourth FET Q4 and the fifth FET Q5 are turned off, and the alarm module 30 is off. The first and second pins 1-2 of the power management 40 receive high level signals, such as logic 1. The power management 40 determines the multi-phase power supply 50 is good. When one of the first to third phase output terminals stops outputting pulse signals, at least one of the first to third FETs will be turned off. The fourth FET Q4 and the fifth FET Q5 are turned on. The alarm module 30 works to indicate the multi-phase power supply 50 is working abnormally. The first and second pins 1-2 of the power management 40 receive low level signals, such as logic 0. The power management 40 controls the multi-phase power supply 50 to stop working.

While the disclosure has been described by way of example and in terms of preferred embodiment, it is to be understood that the disclosure is not limited thereto. To the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A phase detection circuit for a multi-phase power supply, comprising:
   a first power input module connected to a first phase output terminal of the multi-phase power supply to convert a first pulse signal from the first phase output terminal into a direct current (DC) voltage;
   first to third power input terminals to provide high level signals;
   an alarm module;
   first to third electronic switches, wherein the first phase output terminal of the multi-phase power supply is connected to a first terminal of the first electronic switch through the first power input module, the first power input terminal is connected to the second terminal of the first electronic switch, a third terminal of the first electronic switch is grounded, the second terminal of the first electronic switch is also connected to a first terminal of the second electronic switch and a first terminal of the third electronic switch, the second power input terminal is connected to a second terminal of the second electronic switch, a third terminal of the second electronic switch is grounded, the third power input terminal is connected to a second terminal of the third electronic switch, a third terminal of the third electronic switch is grounded, the first power input module outputs a DC voltage to the first terminal of the first electronic switch when the multi-phase power supply operates normally, the second terminal of the first electronic switch is connected to the third terminal of the first electronic switch, the first terminals of the second and third electronic switches are grounded, the second terminal of the second electronic switch is disconnected from the third terminal of the second electronic switch, the second terminal of the third electronic switch is disconnected from the third terminal of the third electronic switch, when the multi-phase power supply operates abnormally, the first terminal of the first electronic switch receives low level signals and the second terminal of the first electronic switch is disconnected from the third terminal of the first electronic switch, the first terminals of the second and third electronic switches receive high level signals, the second terminal of the second electronic switch is connected to the third terminal of the second electronic switch, the second terminal of the third electronic switch is connected to the third terminal of the third electronic switch, the alarm module is connected either between the second power input terminal and the second terminal of the second electronic switch or between the third power input terminal and the second terminal of the third electronic switch, the alarm module is active; and
   a power management module to control the multi-phase power supply on or off, wherein a first pin of the power management module is connected to the second terminal of the second electronic switch, a second pin of the power management module is connected to the second terminal of the third electronic switch, when the first and second pins receive low level signals, the power management module turns off the multi-phase power supply.

2. The phase detection circuit of claim 1, further comprising a second power input module and a fourth electronic switch, wherein the second power input module is connected to a second phase output terminal of the multi-phase power supply to convert a second pulse signal from the second phase output terminal into a direct current (DC) voltage, the second phase output terminal of the multi-phase power supply is connected to a first terminal of the fourth electronic switch through the second power input module, the third terminal of the first electronic switch is grounded through a second terminal of the fourth electronic switch and a third terminal of the fourth electronic switch in that order, when the first terminal of the fourth electronic switch receives high level signals, the second terminal of the fourth electronic switch is connected to the third terminal of the fourth electronic switch, when the first terminal of the fourth electronic switch receives low level signals, the second terminal of the fourth electronic switch is disconnected from the third terminal of the fourth electronic switch.

3. The phase detection circuit of claim 2, further comprising a third power input module and a fifth electronic switch, wherein the third power input module is connected to a third phase output terminal of the multi-phase power supply to convert a third pulse signal from the third phase output terminal into a DC voltage, the third phase output terminal of the multi-phase power supply is connected to a first terminal of the fifth electronic switch through the third power input module, the third terminal of the second electronic switch is grounded through a second terminal of the fifth electronic switch and a third terminal of the fifth electronic switch in that order, when the first terminal of the fifth electronic switch receives high level signals, the second terminal of the fifth electronic switch is connected to the third terminal of the fifth electronic switch, when the first terminal of the fifth electronic switch receives low level signals, the second terminal of the fifth electronic switch is disconnected from the third terminal of the fifth electronic switch.

4. The phase detection circuit of claim 1, wherein the first power input module comprises first to third resistors and a first capacitor, the first phase output terminal of the multi-phase power supply is grounded through the first resistor and the first capacitor in that order, a node between the first resistor and the first capacitor is grounded through the second and third resistors in that order, and a node between the second and third resistors is connected to the first terminal of the first electronic switch.

5. The phase detection circuit of claim 2, wherein the second power input module comprises fourth to sixth resistors and a second capacitor, the second phase output terminal of the multi-phase power supply is grounded through the fourth resistor and the second capacitor in that order, a node between the fourth resistor and the second capacitor is grounded through the fifth and sixth resistors in that order, and a node between the fifth and sixth resistors is connected to the first terminal of the second electronic switch.

6. The phase detection circuit of claim 3, wherein the third power input module comprises seventh to ninth resistors and a third capacitor, the third phase output terminal of the multi-phase power supply is grounded through the seventh resistor and the third capacitor in that order, a node between the seventh resistor and the third capacitor is grounded through the eighth and ninth resistors in that order, and a node between the eighth and ninth resistors is connected to the first terminal of the third electronic switch.

7. The phase detection circuit of claim 4, wherein the first power input module comprises a first diode, the first phase output terminal of the multi-phase power supply is connected to an anode of the first diode, and the first resistor is connected to a cathode of the first diode.

8. The phase detection circuit of claim 5, wherein the second power input module comprises a second diode, the second phase output terminal of the multi-phase power supply is connected to an anode of the second diode, and the fourth resistor is connected to a cathode of the second diode.

9. The phase detection circuit of claim 6, wherein the third power input module comprises a first diode, the first phase output terminal of the multi-phase power supply is connected to an anode of the first diode, and the first resistor is connected to a cathode of the first diode.

10. The phase detection circuit of claim 1, further comprising tenth to thirteen resistors, a fourth power input terminal, and a fourth diode, wherein the first power input terminal is connected to the second terminal of the first electronic switch through the tenth resistor, the second power input terminal is connected to the second terminal of the second electronic switch through the thirteen resistor, the third power input terminal is connected to the second terminal of the third electronic switch through the eleventh resistor, the fourth power input terminal is connected to an anode of the fourth diode through a twelfth resistor, and a cathode of the fourth diode is connected to the second pin of the power management module.

\* \* \* \* \*